(12) United States Patent
Yoon et al.

(10) Patent No.: US 8,852,766 B2
(45) Date of Patent: Oct. 7, 2014

(54) SECONDARY BATTERY PACK

(75) Inventors: Seogjin Yoon, Chungcheongbuk-do (KR); Ki Eob Moon, Seoul (KR); Jung-Hwan Kim, Seoul (KR)

(73) Assignee: LG Chem, Ltd., Seoul (KR)

( * ) Notice: Subject to any disclaimer, the term of this patent is extended or adjusted under 35 U.S.C. 154(b) by 798 days.

(21) Appl. No.: 13/122,302

(22) PCT Filed: Oct. 13, 2009

(86) PCT No.: PCT/KR2009/005868
§ 371 (c)(1),
(2), (4) Date: Jul. 15, 2011

(87) PCT Pub. No.: WO2010/044587
PCT Pub. Date: Apr. 22, 2010

(65) Prior Publication Data
US 2011/0262778 A1    Oct. 27, 2011

(30) Foreign Application Priority Data
Oct. 14, 2008 (KR) .................. 10-2008-0100647

(51) Int. Cl.
*H01M 10/42* (2006.01)
*H01M 2/04* (2006.01)
*H01M 2/10* (2006.01)
*H01M 10/052* (2010.01)

(52) U.S. Cl.
CPC ...... *H01M 2/0404* (2013.01); *H01M 2200/106* (2013.01); *H01M 10/425* (2013.01); *H01M 2200/103* (2013.01); *H01M 2/1061* (2013.01); *H01M 10/052* (2013.01); *H01M 2/0473* (2013.01)
USPC .......................................................... 429/7

(58) Field of Classification Search
CPC  H01M 10/42; H01M 10/425; H01M 10/4257

USPC ............................................................ 429/7
See application file for complete search history.

(56) References Cited

U.S. PATENT DOCUMENTS

2008/0176134 A1    7/2008  Kim

FOREIGN PATENT DOCUMENTS

KP         10-0930473 B1    12/2009
KR    10-2008-0034723 A     4/2008

(Continued)

OTHER PUBLICATIONS

International Search Report PCT/KR2009/005868 dated Apr. 27, 2010.

*Primary Examiner* — Karie O'Neill Apicella
(74) *Attorney, Agent, or Firm* — Birch, Stewart, Kolasch & Birch, LLP (57) ABSTRACT

Disclosed herein is a secondary battery pack including a battery cell having an electrode assembly of a cathode/separator/anode structure mounted in a battery case together with an electrolyte in a sealed state, an insulative mounting member having openings, through which electrode terminals of the battery cell are exposed to the outside, the insulative mounting member being configured to have a structure in which a safety element is mounted to the top of the insulative mounting member, the insulative mounting member being disposed in direct contact with the top of the battery cell, and an insulative cap coupled to the top of the battery cell so that the insulative cap surrounds the insulative mounting member in a state in which the safety element is mounted to the insulative mounting member, wherein the battery case is provided at the top thereof with a coupling groove, and the insulative cap is provided at the bottom thereof with a coupling protrusion formed in a shape corresponding to the coupling groove, the coupling of the insulative cap to the battery cell being achieved by the insertion of the coupling protrusion into the coupling groove.

19 Claims, 4 Drawing Sheets

(56) References Cited

FOREIGN PATENT DOCUMENTS

| KR | 10-0875430 B1 | 12/2008 |
| KR | 10-0930473 B1 | 12/2009 |
| WO | WO 2008/050956 A1 | 5/2008 |
| WO | WO 2008050956 A1 * | 5/2008 | ............ H01M 2/22 |
| WO | WO 2008/066287 A1 | 6/2008 |

* cited by examiner

SECONDARY BATTERY PACK

TECHNICAL FIELD

The present invention relates to a secondary battery pack, and, more particularly, to a secondary battery pack including a battery cell having an electrode assembly of a cathode/separator/anode structure mounted in a battery case together with an electrolyte in a sealed state, an insulative mounting member having openings, through which electrode terminals of the battery cell are exposed to the outside, the insulative mounting member being configured to have a structure in which a safety element is mounted to the top of the insulative mounting member, the insulative mounting member being disposed in direct contact with the top of the battery cell, and an insulative cap coupled to the top of the battery cell so that the insulative cap surrounds the insulative mounting member in a state in which the safety element is mounted to the insulative mounting member, wherein the battery case is provided at the top thereof with a coupling groove, and the insulative cap is provided at the bottom thereof with a coupling protrusion formed in a shape corresponding to the coupling groove, the coupling of the insulative cap to the battery cell being achieved by the insertion of the coupling protrusion into the coupling groove.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent preservation and service-life characteristics, which has been widely used as an energy source for various electronic products as well as for the mobile devices.

However, various combustible materials are contained in the lithium secondary battery. As a result, there is a possibility of danger in that the lithium secondary battery will be heated or explode due to overcharge, overcurrent or any other external physical impacts. In other words, the lithium secondary battery has low safety. Consequently, a protection circuit module (PCM) to effectively control an abnormal state of the lithium secondary battery, such as overcharge, is mounted in the lithium secondary battery in a state in which the PCM is connected to a battery cell of the lithium secondary battery.

Generally, it is necessary for safety elements, including the PCM, to be maintained in electrical connection with electrode terminals of a battery cell and, at the same time, to be electrically isolated from other parts of the battery cell. Consequently, an insulative mounting member is necessary to achieve such connection, and an adhesive agent is applied between the battery cell and the insulative mounting member to achieve the coupling between the battery cell and the insulative mounting member. However, this coupling method may reduce the coupling strength of a battery pack. An electric short circuit may occur in the battery cell due to reduction of the coupling strength, when external impact is applied to the battery cell, with the result that the battery cell may catch fire or explode. In other words, safety-related problems may occur.

Also, an insulative cap is coupled to the top of the battery cell so that the insulative cap surrounds the insulative mounting member in a state in which the safety elements are mounted to the insulative mounting member to protect the battery cell against external impact, to increase the mechanical strength of the members mounted to the top of the battery cell and to maintain electrical insulation of the battery cell.

In this case, the coupling between the insulative cap and the top of the battery cell is generally achieved by bonding. However, this coupling method may also reduce the coupling strength between the battery cell and the insulative cap like the coupling between the battery cell and the insulative mounting member as described above.

Consequently, there is a high necessity for technology to secure stable coupling strength between the battery cell and the insulative cap.

DISCLOSURE

Technical Problem

Therefore, the present invention has been made to solve the above problems, and other technical problems that have yet to be resolved.

As the result of a variety of extensive and intensive studies and experiments to solve the problems as described above, the inventors of the present application have found that, when a secondary battery pack is configured by coupling an insulative cap to the top of a battery cell through a specific coupling structure between the insulative cap and the battery cell, an assembly process of the secondary battery pack is greatly simplified and, at the same time, the coupling strength between the battery cell and the insulative cap is stably maintained.

Therefore, it is an object of the present invention to provide a secondary battery pack wherein an insulative cap is coupled to the top of a battery cell through a specific coupling structure between the battery cell and the insulative cap.

Technical Solution

In accordance with one aspect of the present invention, the above and other objects can be accomplished by the provision of a secondary battery pack including a battery cell having an electrode assembly of a cathode/separator/anode structure mounted in a battery case together with an electrolyte in a sealed state, an insulative mounting member having openings, through which electrode terminals of the battery cell are exposed to the outside, the insulative mounting member being configured to have a structure in which a safety element is mounted to the top of the insulative mounting member, the insulative mounting member being disposed in direct contact with the top of the battery cell, and an insulative cap coupled to the top of the battery cell so that the insulative cap surrounds the insulative mounting member in a state in which the safety element is mounted to the insulative mounting member, wherein the battery case is provided at the top thereof with a coupling groove, and the insulative cap is provided at the bottom thereof with a coupling protrusion formed in a shape corresponding to the coupling groove, the coupling of the insulative cap to the battery cell being achieved by the insertion of the coupling protrusion into the coupling groove.

As described above, the secondary battery pack according to the present invention includes the battery cell, in which the electrode assembly is mounted, the insulative mounting member, to the top of which the safety element is mounted in a state in which the insulative mounting member is disposed in tight contact with the top of the battery cell, and the insulative cap, which is coupled to the top of the battery cell. The coupling between the top of the battery cell and the insulative cap is achieved by the insertion of the coupling protrusion into the coupling groove corresponding to the coupling protrusion.

Generally, the coupling of the insulative cap to the battery case is achieved by bonding as previously described. However, this coupling method may reduce the coupling strength of the battery pack. Also, the maintenance of the battery pack is not easy.

In the secondary battery pack according to the present invention, on the other hand, coupling of the insulative cap to the battery case is achieved by the mechanical coupling between and the coupling grooves of the battery case and the coupling protrusion of the insulative cap. Consequently, a manufacturing process of the battery pack is simplified, thereby reducing manufacturing cost and achieve easy maintenance of the battery pack.

Also, the contact interface between the narrow and long coupling groove formed at the top of the battery case and the coupling protrusion of the insulative cap is increased, and therefore, the coupling force between the coupling protrusion and the coupling groove is further increased.

The coupling groove may be formed at the top of the battery case so that the coupling groove is spaced a predetermined distance from the outer circumference of the top of the battery case in a state in which the coupling groove is parallel to the outer circumference of the top of the battery case. For example, the coupling groove may be formed partially or wholly at regions of the top of the battery case excluding a protruding terminal, an electrolyte injection port and a nickel clad member disposed at the top of the battery cell.

In the above structure, the distance may be, for example, 2 to 10% of the width of the top of the battery cell at a region of the top of the battery cell where the coupling groove does not interfere with the protruding terminal, the electrolyte injection port and the nickel clad member disposed at the top of the battery cell as described above.

The coupling groove may be formed in a planar narrow and long straight shape or in a planar narrow and long '=' shape. In a case in which the coupling groove is formed in the shape of a railroad track, an example of the '=' shape, the contact interface between the coupling groove and the coupling protrusion is increased as compared with a case in which the coupling groove is formed in a straight shape.

The structure of the coupling groove is not particularly restricted so long as the coupling groove is formed at the top of the battery case so that the coupling groove has a depth sufficient for the coupling protrusion of the insulative cap to be easily coupled into the coupling groove. For example, the coupling groove may be formed at the top of the battery case so that the coupling groove has a depth equivalent to 10 to 70% of the thickness of the battery case.

If the depth of the coupling groove is less than 10% of the thickness of the battery case, it is difficult to achieved desired coupling force between the battery case and the insulative cap. If the depth of the coupling groove is more than 70% of the thickness of the battery case, on the other hand, the mechanical strength of the battery case is reduced.

The coupling protrusion may be formed at the bottom of the insulative cap so that the coupling protrusion has a size corresponding to the depth of the coupling groove for the coupling protrusion to be disposed in tight contact with the bottom of the coupling groove.

It is required for the battery case to be easily manufactured and to exhibit a mechanical strength greater than a predetermined level. For this reason, the battery case may be a metal container, preferably an aluminum container.

The insulative mounting member is configured to have a structure in which the safety element is mounted to the top of the insulative mounting member. The insulative mounting member is formed of an insulative material and is disposed in direct contact with the top of the battery cell. In a preferred example, the insulative mounting member may have a smaller size than the top of the battery cell, and the insulative mounting member may be provided with a first opening, through which the first electrode terminal of the battery cell is exposed to the outside, formed at the middle thereof and a second opening, through which a portion (the second electrode terminal) of the top of the battery cell is exposed to the outside, spaced a predetermined distance from the first opening. Also, opposite ends of the insulative mounting member may protrude upward by a predetermined height so that the safety element can be stably coupled to the top of the insulative mounting member.

That is, since the insulative mounting member has a smaller size than the top of the battery cell, the insulative cap may be easily coupled to the top of the battery cell so that the insulative cap surrounds the insulative mounting member in a state in which the insulative mounting member is mounted to the top of the battery cell.

The safety element may include a rectangular protection circuit module (PCM) having a protection circuit to control the overcharge, overdischarge and overcurrent of the battery cell and a pair of connecting members electrically connected to the protection circuit, which is mounted to the bottom of the rectangular protection circuit module. For example, the safety element may be one or more selected from a group consisting of a positive temperature coefficient (PTC) element, a fuse and a protection circuit board.

According to circumstances, the safety element may include the PTC element and the protection circuit board. One end of the PTC element may be connected to the first electrode terminal of the battery cell, the other end of the PTC element may be connected to the protection circuit board, and the second electrode terminal of the battery cell may be connected to the protection circuit board.

For example, the electrical connection (a) between the PTC element and the protection circuit board and the electrical connection (b) between the second electrode terminal of the battery cell and the protection circuit board may be achieved by variable connecting members. In particular, a connecting member for the electrical connection (a) and a connecting member for the electrical connection (b) may be coupled to the protection circuit board, and then the connecting members may be coupled to the respective electrode terminals of the battery cell.

The connecting members are not particularly restricted so long as the connecting members are made of a variable conductive material. Preferably, each of the connecting members is formed of a nickel plate.

The connecting members may be coupled to the electrode terminals of the battery cell, in a state in which the protection circuit board is placed on the top of the battery cell so that the angle between the protection circuit board and the top of the battery cell is approximately 90 degrees or more, and the variable connecting members may be bent so that the protection circuit board is mounted to the insulative mounting member in a state in which the protection circuit board is parallel to the top of the battery cell. Consequently, the connecting members may be coupled to the protection circuit board so that the bent portions of the connecting members are directed to the same side.

For example, the nickel plates may be coupled to the electrode terminals by spot welding, in a state in which the plateshaped PCM is located so that the PCM is perpendicular to the top of the battery cell, and the nickel plates may be bent and coupled to each other so that the PCM is mounted to the insulative mounting member in a state in which the PCM is in parallel to the top of the battery cell.

The coupling between the coupling groove and the coupling protrusion is achieved in the longitudinal direction of the battery cell with the result that the coupling groove and the coupling protrusion may be more easily separated from each other by the longitudinal tensile force than impact applied to the battery cell in the direction perpendicular to the battery cell. For this reason, the coupling protrusion may be inserted into the coupling groove, after an adhesive agent is injected into the coupling groove, to solve the above-mentioned problem.

According to circumstances, an adhesive agent may be further applied to the top of the battery cell or the bottom of the insulative cap so as to increase the coupling strength between the coupling groove and the coupling protrusion.

The insulative cap may extend downward by a predetermined length sufficient for at least a portion of the insulative cap to surround the outside of the top of the battery cell in a state in which the insulative cap is mounted to the battery cell.

For example, the downward extending portion of the insulative cap may be coupled to the outside of the top of the battery cell by bonding or mechanical coupling.

The secondary battery pack may further include another insulative cap (bottom cap) coupled to the bottom of the battery cell in addition to the insulative cap coupled to the top of the battery cell. Also, the secondary battery pack may further include a sheathing film attached to the outside of the battery case of the battery cell. As a result, it is possible to protect the battery cell against external impact and to maintain the electrical insulation of the battery pack.

Preferably, the sheathing film is attached to the outside of the battery case of the battery cell so that the sheathing film surrounds the downward extending portion of the insulative cap.

In the secondary battery pack according to the present invention, any battery cells may be used in various manners irrespective of the kind and shape of the battery cells. A prismatic lithium secondary battery cell is preferably used.

In accordance with another aspect of the present invention, there is provided a secondary battery pack wherein coupling force between a battery case and an insulative mounting member is increased. Specifically, the secondary battery pack includes a battery cell having an electrode assembly of a cathode/separator/anode structure mounted in a battery case together with an electrolyte in a sealed state, an insulative mounting member having openings, through which electrode terminals of the battery cell are exposed to the outside, the insulative mounting member being configured to have a structure in which a safety element is mounted to the top of the insulative mounting member, the insulative mounting member being disposed in direct contact with the top of the battery cell, and an insulative cap coupled to the top of the battery cell so that the insulative cap surrounds the insulative mounting member in a state in which the safety element is mounted to the insulative mounting member, wherein the battery case is provided at the top thereof with at least one coupling groove, and the insulative mounting member is provided at the bottom thereof with at least one coupling protrusion formed in a shape corresponding to the at least one coupling groove, the coupling of the insulative mounting member to the battery cell being achieved by the insertion of the at least one coupling protrusion into the at least one coupling groove.

The contact interface between the coupling groove formed at the top of the battery case and the coupling protrusion formed at the insulative mounting member is increased, and therefore, the coupling force between the coupling groove and the coupling protrusion is further increased.

The structure of the coupling groove is not particularly restricted so long as the coupling force between the coupling protrusion of the insulative mounting member and the coupling groove is increased. For example, the coupling groove may be formed in a planar straight shape, in a planar cross shape or in a planar oval shape in which the contact interface between the coupling groove and the coupling protrusion is further increased.

In this case, the coupling groove may be formed at the top of the electrode terminal upwardly exposed from the top of the battery case. Specifically, the coupling groove may be formed a region of the top of the battery case where the coupling groove does not interfere with a protruding terminal, an electrolyte injection port and a nickel clad member disposed at the top of the battery case.

According to circumstances, both the coupling groove for coupling of the insulative cap to the battery case and the coupling groove for coupling of the insulative mounting member to the battery case may be formed at the top of the battery case.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
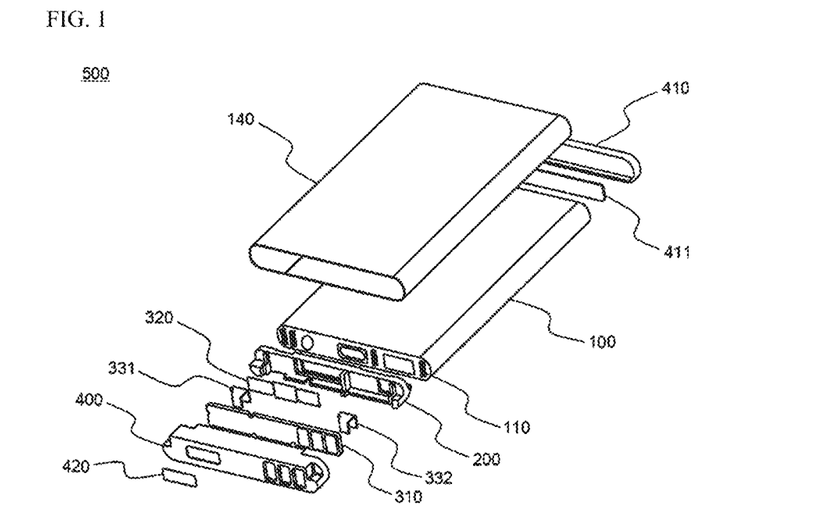
FIG. 1 is an exploded perspective view illustrating a secondary battery pack according to an embodiment of the present invention.
Figure 2:
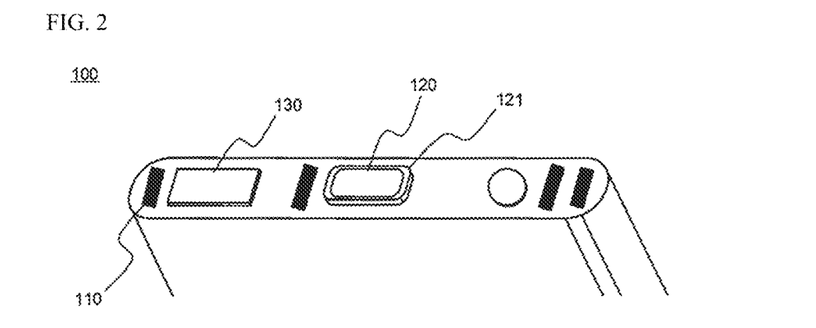
FIG. 2 is a partial perspective view illustrating the top of a battery cell of FIG. 1.
Figure 3:
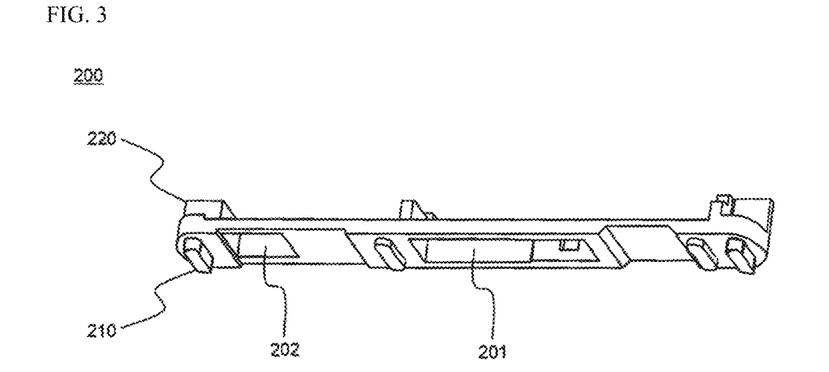
FIG. 3 is a perspective view illustrating an insulative mounting member, which will be mounted to the top of the battery cell of FIG. 1.

FIG. 1 is an exploded perspective view typically illustrating a secondary battery pack according to an embodiment of the present invention, FIG. 2 is a partial perspective view typically illustrating the top of a battery cell of FIG. 1, and FIG. 3 is a perspective view typically illustrating an insulative mounting member mounted to the top of the battery cell of FIG. 1.

Referring to these drawings, a secondary battery pack 500 includes s battery cell 100, an insulative mounting member 200, safety elements such as a protection circuit board 310 and a positive temperature coefficient (PTC) element 320, insulative top and bottom caps 400 and 410, and a sheathing film 140.

The battery cell 100 is constructed in a structure in which an electrode assembly of a cathode/separator/anode structure is mounted in a prismatic metal container together with an electrolyte in a sealed state. Straight type coupling grooves 110 are formed at the top of the battery cell 100 so that the insulative mounting member 200 is coupled to the battery cell 100 through the coupling grooves 110.

The insulative mounting member 200 has openings, through which electrode terminals 120 and 130 of the battery cell 100 are exposed to the outside. Opposite ends of the insulative mounting member 200 protrude upward by a predetermined height so that the safety elements, such as the protection circuit board 310 and the PTC element 320, can be stably coupled to the top of the insulative mounting member 200. The insulative mounting member 200 is mounted to the top of the battery cell 100 in a state in which the insulative mounting member 200 is in direct contact with the top of the battery cell 100. Also, straight type coupling protrusions 210, corresponding to the coupling grooves formed at the top of the battery cell 100, are formed at the bottom of the insulative mounting member 200.

The insulative top cap 400 is coupled to the top of the battery cell 100 so that the insulative top cap 400 surrounds the insulative mounting member 200 in a state in which the safety elements are coupled to the top of the insulative mounting member 200. The insulative top cap 400 extends downward by a predetermined length sufficient to surround the outside of the top of the battery cell 100. A warranty label 420 is attached to one side of the top of the insulative top cap 400.

The insulative bottom cap 410 is attached to the bottom of the battery cell 100 by an adhesive bottom cap tape 411. The outer circumference of the battery cell 100 is surrounded by the insulative sheathing film 140.

Hereinafter, the top of the battery cell of FIG. 1 and the insulative mounting member 200, which will be mounted to the top of the battery cell, will be described in more detail with reference to FIGS. 2 and 3.

Referring to FIG. 2, an anode terminal 120 protrudes from the middle of the top of the battery cell 100, and a battery case constitutes a cathode. The anode terminal 120 is electrically insulated from the battery case by an insulative member 121. Consequently, a cathode terminal 130 is formed by attaching a nickel clad member to a predetermined region of the top of the battery cell 100. The coupling grooves 110 are formed at the top of the battery cell 100 so that the coupling protrusions 210 (FIG. 3) of the insulative mounting member 200 (see FIG. 1) are coupled into the coupling grooves 110.

Referring to FIG. 3, the insulative mounting member 200 has a smaller size than the top of the battery cell 100. The insulative mounting member 200 is provided at the middle thereof with a first opening 201, through which the anode terminal 120 (see FIG. 2) of the battery cell 100 is exposed to the outside. Also, a second opening 202, through which a portion (the cathode terminal 130 (see FIG. 2)) of the top of the battery cell 100 is exposed to the outside, is formed at the insulative mounting member 200 so that the second opening 202 is spaced a predetermined distance from the first opening 201. Opposite ends 220 of the insulative mounting member 200 protrude upward by a predetermined height so that the safety elements can be stably coupled to the top of the insulative mounting member 200.

Also, the coupling protrusions 210, corresponding to the coupling grooves 110 (FIG. 2) formed at the top of the battery cell 100, are formed at the bottom of the insulative mounting member 200. The coupling protrusions 210 are coupled into the coupling grooves 110 formed at the top of the battery cell 100, thereby achieving the mechanical coupling between the insulative mounting member 200 and the battery cell 100.

Figure 4:
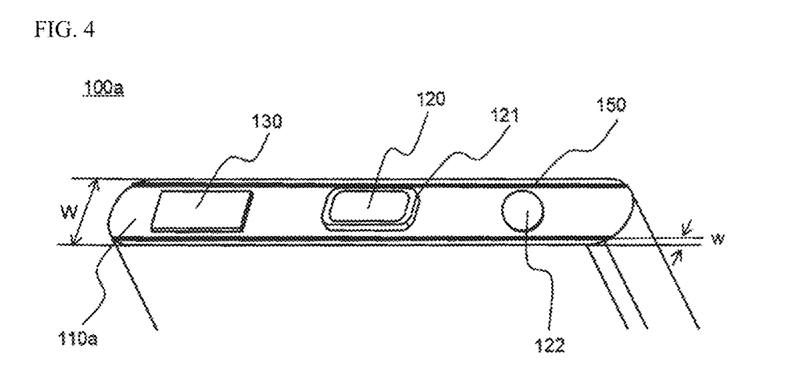
FIG. 4 is a partial perspective view illustrating the top of a battery cell according to another embodiment of the present invention.

FIG. 4 is a partial perspective view illustrating the top of a battery cell according to another embodiment of the present invention.

Referring to FIG. 4, narrow and long coupling grooves 150 are formed at the top of a battery case 110a generally in the shape of a railroad track so that each of the coupling grooves 150 is spaced a distance w equivalent to 2% of the width W of the top of the battery cell from the outer circumference of the top of the battery case 110a in a state in which the coupling grooves 150 are parallel to the outer circumference of the top of the battery case 110a.

Also, the coupling grooves 150 are formed at regions of the top of the battery case 110a where the coupling grooves 150 do not interfere with an anode terminal 120, a cathode terminal 130, which is a nickel clad member, and an electrolyte injection port 122 disposed at the top of the battery case 110a.

Figure 5:
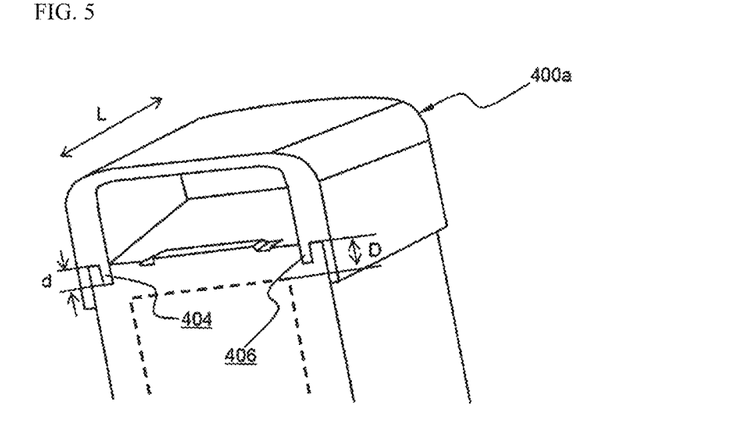
FIG. 5 is a partial typical view illustrating a state in which an insulative cap is mounted to the top of the battery cell of FIG. 4.
Figure 6:
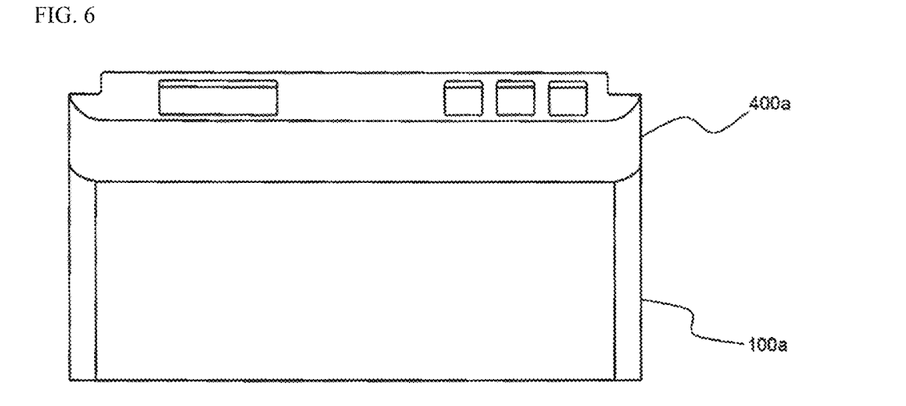
FIG. 6 is a perspective view illustrating a state in which the insulative cap of FIG. 5 is mounted to the top of the battery cell of FIG. 4.

FIG. 5 is a partial typical view illustrating a state in which an insulative cap is mounted to the top of the battery cell of FIG. 4, and FIG. 6 is a perspective view typically illustrating a state in which the insulative cap of FIG. 5 is mounted to the top of the battery cell of FIG. 4.

Referring to FIG. 5, an insulative cap 400a is provided at the bottom thereof with coupling protrusions 406, formed in a shape corresponding to the coupling grooves 150 of FIG. 4, i.e. in a '=' shape, extending in the longitudinal direction L of the top of the battery cell.

Also, coupling grooves 404 are formed at the top of a battery case so that each of the coupling grooves 404 has a depth d equivalent to approximately 50% of the thickness D of the battery case.

Referring to FIG. 6 together with FIG. 5, the coupling protrusions 406 of the insulative cap 400a are coupled into the coupling grooves 404 formed at the top of the battery cell 100a so that the insulative cap 400a surrounds the insulative mounting member 200 (FIG. 1) in a state in which safety elements (not shown) are disposed on the insulative mounting member 200, thereby achieving mechanical coupling between the insulative cap 400a and the battery cell 100.

Figure 7:
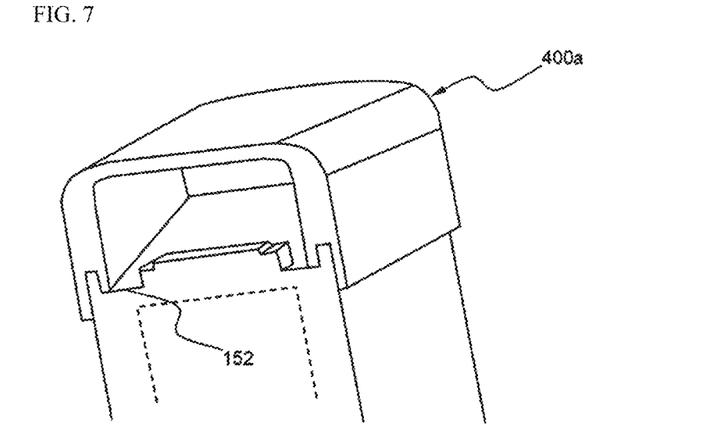
FIG. 7 is a partial typical view illustrating a state in which an insulative cap is mounted to the top of a battery cell according to a modified embodiment of the present invention.

FIG. 7 is a partial typical view illustrating a state in which an insulative cap is mounted to the top of a battery cell according to a modified embodiment of the present invention.

Referring to FIG. 7 together with FIG. 5, the width of each coupling groove 152 formed at the top of a battery case is greater than that of each of the coupling grooves 404 of FIG. 5.

Figure 8:
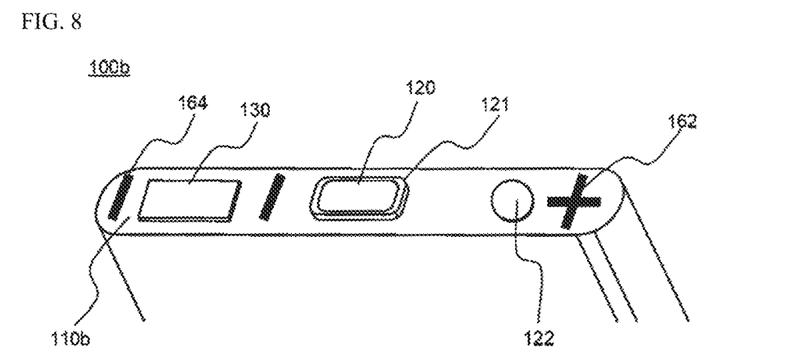
FIG. 8 is a partial perspective view illustrating the top of a battery cell according to another embodiment of the present invention.
Figure 9:
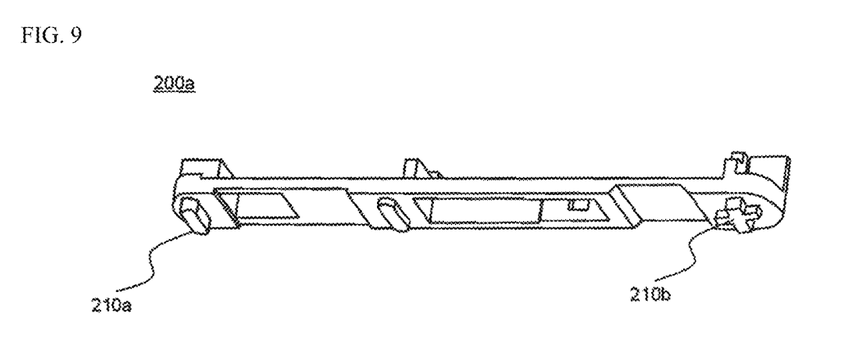
FIG. 9 is a perspective view illustrating an insulative mounting member, which will be mounted to the top of the battery cell of FIG. 7.

FIG. 8 is a partial perspective view typically illustrating the top of a battery cell according to another embodiment of the present invention, and FIG. 9 is a perspective view typically illustrating an insulative mounting member, which will be mounted to the top of the battery cell of FIG. 7.

Referring first to FIG. 8, two straight type coupling grooves 164 and a cross type coupling groove 162 are formed at regions of the top of a battery case 110b where the straight type coupling grooves 164 and the cross type coupling groove 162 do not interfere with an anode terminal 120, a cathode terminal 130, which is a nickel clad member, and an electrolyte injection port 122 disposed at the top of the battery case 110b.

Referring now to FIG. 9, an insulative mounting member 200a is provided at the bottom thereof with two straight type coupling protrusions corresponding to the coupling grooves 164 of FIG. 8 and a cross type coupling protrusions corresponding to the coupling groove 162 of FIG. 8.

Figure 10:
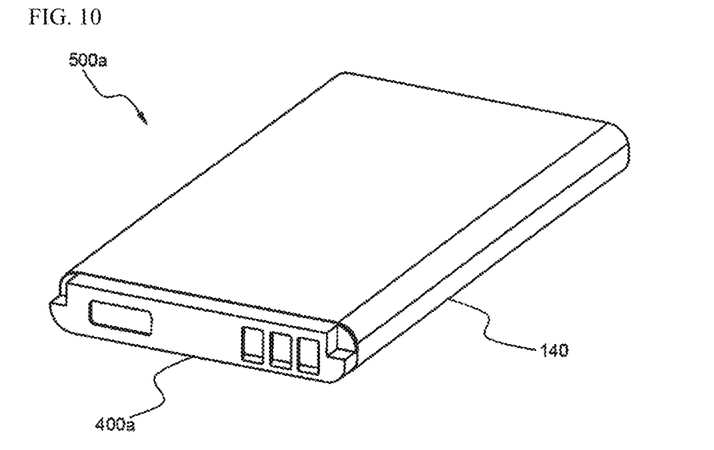
FIG. 10 is a perspective view illustrating a secondary battery pack manufactured according to the embodiment of FIG. 5.

FIG. 10 is a perspective view typically illustrating a secondary battery pack manufactured according to the embodiment of FIG. 5.

Referring to FIG. 10, a secondary battery pack 500a is configured so that the remaining parts of the secondary battery pack 500a, excluding external input and output terminal parts, are electrically insulated from the outside by the insulative cap 400a, the sheathing film 140, and the bottom cap (not shown), in a state in which the safety elements and the insulative mounting member are mounted to the top of the battery cell.

The shape, position, and number of the coupling grooves, formed at the top of the battery cell, and the coupling protrusions corresponding to the coupling grooves may be variously changed based on the above description within the scope of the present invention.

Hereinafter, an example of the present invention will be described in more detail. It should be noted, however, that the scope of the present invention is not limited by the illustrated example.

Example 1

Slurry, prepared by mixing lithium cobalt oxide, PVdf and a conducting agent in a generally known composition ratio, was coated on an aluminum current collector to manufacture a cathode. Slurry, prepared by mixing graphite, PVdf and a conducting agent in a generally known composition ratio, was coated on a copper current collector to manufacture an anode.

A separator cut so as to have a size slightly greater than that of the cathode and the anode was disposed between the cathode and the anode to manufacture an electrode assembly. The manufactured electrode assembly was mounted in a prismatic aluminum battery container. A battery container cover was mounted to the battery container, and an electrolyte was injected into the battery case through an electrolyte injection port to manufacture a battery cell.

An insulative mounting member was mounted to the top of the battery cell configured as shown in FIG. 4, and safety elements were connected to the insulative mounting member. Subsequently, coupling protrusions formed at the bottom of an insulative cap were coupled into coupling grooves formed at the top of the battery case in a state in which a adhesive agent is applied to coupling grooves so that the insulative cap were mounted to the top of the battery cell.

Subsequently, an insulative bottom cap was coupled to the bottom of the battery cell, and the outer circumference of the battery cell was covered by a sheathing film, to manufacture a secondary battery pack as shown in FIG. 10.

Comparative Example 1

A secondary battery pack was manufactured in the same manner as Example 1 except that the insulative cap was coupled to the battery cell by a adhesive agent applied between the battery cell and the insulative cap without forming the coupling grooves and the coupling protrusions at the top of the battery cell and at the bottom of the insulative cap.

Experimental Example 1

Figure 11:
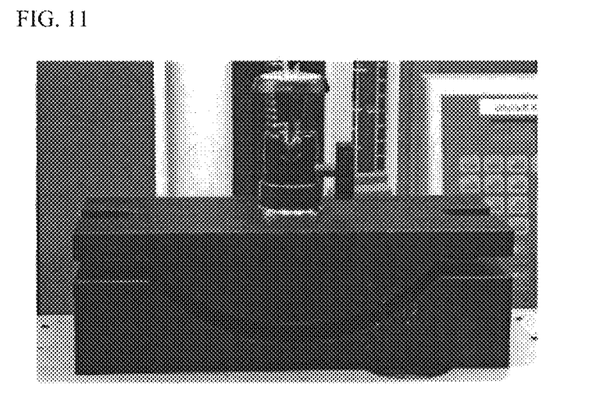
FIG. 11 is a photograph illustrating an experimental process performed according to Experimental Example 1 of the present invention.

Bending tests were carried out on 20 battery packs manufactured according to Example 1 and 20 battery packs manufactured according to Comparative Example 1 to measure the coupling strength between the battery cell of each of the battery packs and the insulative cap coupled to the battery cell (See FIG. 11). That is, load applied to the middle of each of the battery packs was gradually increased in a state in which the insulative top cap and the insulative bottom cap of each of the battery packs were fixed to measure the magnitudes of the load when the battery packs broke. The experiment results are indicated in Table 1 below.

TABLE 1

| Breaking load (kgf) | Example 1 | Comparative Example 1 |
| --- | --- | --- |
| 25 or less | 0 | 6 |
| 25 to 30 | 0 | 12 |
| 30 to 35 | 0 | 2 |
| 45 to 50 | 0 | — |
| 50 to 55 | 12 | — |
| 55 or more | 8 | — |

As can be seen from Table 1 above, the coupling force of the battery packs manufactured according to the example of the present invention was greatly increased as compared with the coupling force of the battery packs manufactured according to Comparative Example 1.

That is, when a load of 35 kgf or less was applied to the battery packs manufactured according to Comparative Example 1, the battery packs broke. Most of the battery packs broke even when a load of less than 30 kgf was applied to the battery packs. On the contrary, only when a load of 50 kgf or more was applied to the battery packs manufactured according to Example 1, the battery packs broke. Some of the battery packs withstood even a load of 55 kgf. This is because, for the battery packs manufactured according to Comparative Example 1, the separation between the battery cells and the corresponding insulative caps occurred when impact having a magnitude exceeding the adhesive force of the adhesive agent used to couple the battery cells and the corresponding insulative caps was applied to the battery packs, whereas, for the battery packs manufactured according to Example 1, the coupling force between the battery cells and the corresponding insulative caps was greatly increased by the mechanical coupling between the coupling protrusions and the corresponding coupling grooves even when only a relatively small amount of an adhesive agent was used or an adhesive agent was not used.

Experimental Example 2

Figure 12:
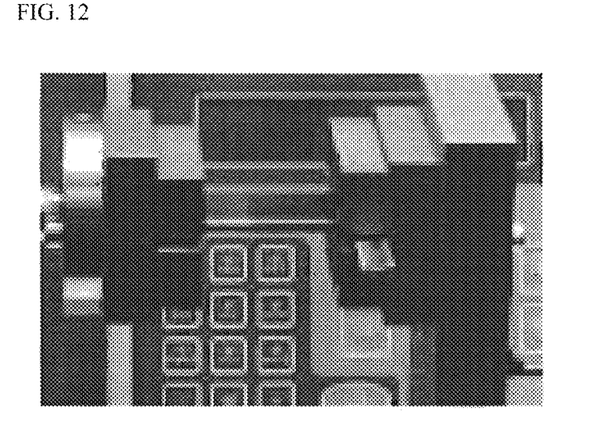
FIG. 12 is a photograph illustrating an experimental process performed according to Experimental Example 2 of the present invention.

Twist tests were carried out on 20 battery packs manufactured according to Example 1 and 20 battery packs manufactured according to Comparative Example 1 to measure the coupling strength between the battery cell of each of the battery packs and the insulative mounting member coupled to the battery cell (See FIG. 12). That is, external force was applied to the insulative bottom cap of each of the battery packs in one direction in a state in which the insulative top cap of each of the battery packs was fixed so that the insulative bottom cap of each of the battery packs was twisted. At this time, the external force was gradually increased to measure the magnitudes of the external force when the separation between the battery cell of each of the battery packs and the insulative cap coupled to the top of the battery cell occurred. The experiment results are indicated in Table 2 below.

TABLE 2

| Breaking torque (kg · cm) | Example 1 | Comparative Example 1 |
|---|---|---|
| 20 or less | 0 | 15 |
| 20 to 25 | 0 | 5 |
| 25 to 30 | 0 | — |
| 30 to 35 | 0 | — |
| 35 to 40 | 0 | — |
| 40 to 45 | 11 | — |
| 45 or more | 9 | — |

As can be seen from Table 2 above, the coupling force of the battery packs manufactured according to the example of the present invention was greatly increased as compared with the coupling force of the battery packs manufactured according to Comparative Example 1.

That is, when an external force of 25 kg·cm or less was applied to the battery packs manufactured according to Comparative Example 1, the battery packs broke. On the contrary, only when an external force of 40 kg·cm or more was applied to the battery packs manufactured according to Example 1, the battery packs broke. This is because, for the battery packs manufactured according to Comparative Example 1, the coupling between the battery cells and the corresponding insulative caps was accomplished by only the adhesive agent, whereas, for the battery packs manufactured according to Example 1, the coupling between the battery cells and the corresponding insulative caps was accomplished by the mechanical coupling between the coupling protrusions and the corresponding coupling grooves. Especially, the coupling force of the battery packs manufactured according to Example 1 was greatly increased when twisting force was applied to the battery packs.

INDUSTRIAL APPLICABILITY

As is apparent from the above description, the assembly process of the secondary battery pack according to the present invention is greatly simplified. Also, the coupling strength between the battery cell and the insulative cap is stably maintained.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery pack comprising:
   a battery cell having an electrode assembly of a cathode/separator/anode structure mounted in a battery case together with an electrolyte in a sealed state;
   an insulative mourning member having openings, through which electrode terminals of the battery cell are exposed to the outside, the insulative mounting member being configured to have a structure in which a safety element is mounted to the top of the insulative mounting member, the insulative mounting member being disposed in direct contact with the top of the battery cell; and
   an insulative cap coupled to the top of the battery cell so that the insulative cap surrounds the insulative mounting member in a state in which the safety element is mounted to the insulative mounting member, wherein
   the battery case is provided at the top thereof with a coupling groove, and the insulative cap is provided at the bottom thereof with a coupling protrusion formed in a shape corresponding to the coupling groove, the coupling of the insulative cap to the battery cell being achieved by the insertion of the coupling protrusion into the coupling groove.

2. The secondary battery pack according to claim 1, wherein the coupling groove is formed at the top of the battery case so that the coupling groove is spaced a predetermined distance from the outer circumference of the top of the battery case in a state in which the coupling groove is parallel to the outer circumference of the top of the battery case.

3. The secondary battery pack according to claim 2, wherein the distance is 2 to 10% of the width of the top of the battery cell.

4. The secondary battery pack according to claim 1, wherein the coupling groove is formed in a planar narrow and long straight shape or in a planar narrow and long '=' shape.

5. The secondary battery pack according to claim 1, wherein the coupling groove is formed at the top of the battery case so that the coupling groove has a depth equivalent to 2 to 50% of the thickness of the battery case.

6. The secondary battery pack according to claim 1, wherein the coupling protrusion is formed at the bottom of the insulative cap so that the coupling protrusion has a size corresponding to the depth of the coupling groove.

7. The secondary battery pack according to claim 1, wherein the battery case is a metal container.

8. The secondary battery pack according to claim 1, wherein the insulative mounting member has a smaller size than the top of the battery cell, and the insulative mounting member is provided with a first opening, through which the first electrode terminal of the battery cell is exposed to the outside, formed at the middle thereof and a second opening, through which a portion (the second electrode terminal) of the top of the battery cell is exposed to the outside, spaced a predetermined distance from the first opening.

9. The secondary battery pack according to claim 8, wherein opposite ends of the insulative mounting member protrude upward by a predetermined height.

10. The secondary battery pack according to claim 1, wherein the safety element is one or more selected from a group consisting of a positive temperature coefficient (PTC) element, a fuse and a protection circuit board.

11. The secondary battery pack according to claim 1, wherein the safety element comprises a PTC element and a protection circuit board, one end of the PTC element is connected to the first electrode terminal of the battery cell, the other end of the PTC element is connected to the protection circuit board, and the second electrode terminal of the battery cell is connected to the protection circuit board.

12. The secondary battery pack according to claim 1, wherein an adhesive agent is injected into the coupling groove before the coupling protrusion is inserted into the coupling groove.

13. The secondary battery pack according to claim 1, wherein the insulative cap extends downward by a predetermined length sufficient for at least a portion of the insulative cap to surround the outside of the top of the battery cell in a state in which the insulative cap is mounted to the battery cell.

14. The secondary battery pack according to claim 1, further comprising a sheathing film attached to the outside of the battery case.

15. The secondary battery pack according to claim 14, wherein the sheathing film is attached to the outside of the battery case so that the sheathing film surrounds the downward extending portion of the insulative cap.

16. The secondary battery pack according to claim 1, wherein the battery cell is a prismatic lithium secondary battery cell.

17. The secondary battery pack according to claim 1, wherein
   the insulative mounting member is also provided at a bottom thereof with at least one coupling protrusion,
   the battery case is provided at the top thereof with at least one coupling groove formed in a shape corresponding to the at least one protrusion of the insulative mounting member, and
   the coupling of the insulative mounting member to the battery cell being achieved by the insertion of the at least one coupling protrusion of the insulative mounting member into the at least one coupling groove of the battery case corresponding to the at least one coupling protrusion of the insulative mounting member.

18. The secondary battery pack according to claim 17, wherein the coupling groove of the battery case corresponding to the coupling protrusion of the insulative mounting member formed in a planar straight shape, in a planar cross shape or in a planar oval shape.

19. The secondary battery pack according to claim 18, wherein the coupling groove of the battery case corresponding to the at least one coupling protrusion of the insulative mounting member is formed at the top of the electrode terminal upwardly exposed from the top of the battery case.

* * * * *